(12) United States Patent
Ma et al.

(10) Patent No.: US 11,714,534 B2
(45) Date of Patent: Aug. 1, 2023

(54) MAP DISPLAYING METHOD, ELECTRONIC DEVICE, STORAGE MEDIUM AND TERMINAL DEVICE

(71) Applicant: Beijing Baidu Netcom Science Technology Co., Ltd., Beijing (CN)

(72) Inventors: Wenjie Ma, Beijing (CN); Da Qu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/494,659

(22) Filed: Oct. 5, 2021

(65) Prior Publication Data
US 2022/0027043 A1    Jan. 27, 2022

(30) Foreign Application Priority Data
Dec. 21, 2020    (CN) .................. 202011557086.X (51) Int. Cl.
*G06F 3/048*   (2013.01)
*G06F 3/04845*  (2022.01)
*G06F 3/04815*  (2022.01)

(52) U.S. Cl.
CPC ...... *G06F 3/04845* (2013.01); *G06F 3/04815* (2013.01)

(58) Field of Classification Search
None
See application file for complete search history.

(56) References Cited

U.S. PATENT DOCUMENTS

2012/0223936 A1* 9/2012 Aughey .............. G06F 3/04815
345/419
2014/0365935 A1* 12/2014 Moha .................. G06F 3/04842
715/769

* cited by examiner

*Primary Examiner* — William C Trapanese
(74) *Attorney, Agent, or Firm* — Faegre Drinker Biddle & Reath LLP (57) ABSTRACT

A map displaying method, an electronic device, a storage medium and a terminal device are provided, and relate to the technical fields of computer vision and intelligent transportation. The method includes: receiving a trigger operation in a case that a terminal device displays a map of a first area, and determining a screen coordinate of the trigger point, where the map of the first area is a map where a first position is at a center area; determining a coordinate of a ground projection point corresponding to the trigger point based on the screen coordinate of the trigger point; switching a currently displayed map of the first area to a map of a second area, in a case that the ground projection point falls within the first area, wherein the map of the second area is a map where the ground projection point is at a center area.

11 Claims, 5 Drawing Sheets

MAP DISPLAYING METHOD, ELECTRONIC DEVICE, STORAGE MEDIUM AND TERMINAL DEVICE

CROSS-REFERENCE TO RELATED APPLICATION

This application claims priority to Chinese Patent Application No. 202011557086.X, filed on Dec. 21, 2020, which is hereby incorporated by reference in its entirety.

TECHNICAL FIELD

The present disclosure relates to the technical field of computer vision, in particular to the technical field of intelligent transportation, and specifically to a map displaying method, apparatus and device, a storage medium, a computer program product, and a terminal device.

BACKGROUND

Figure 1:
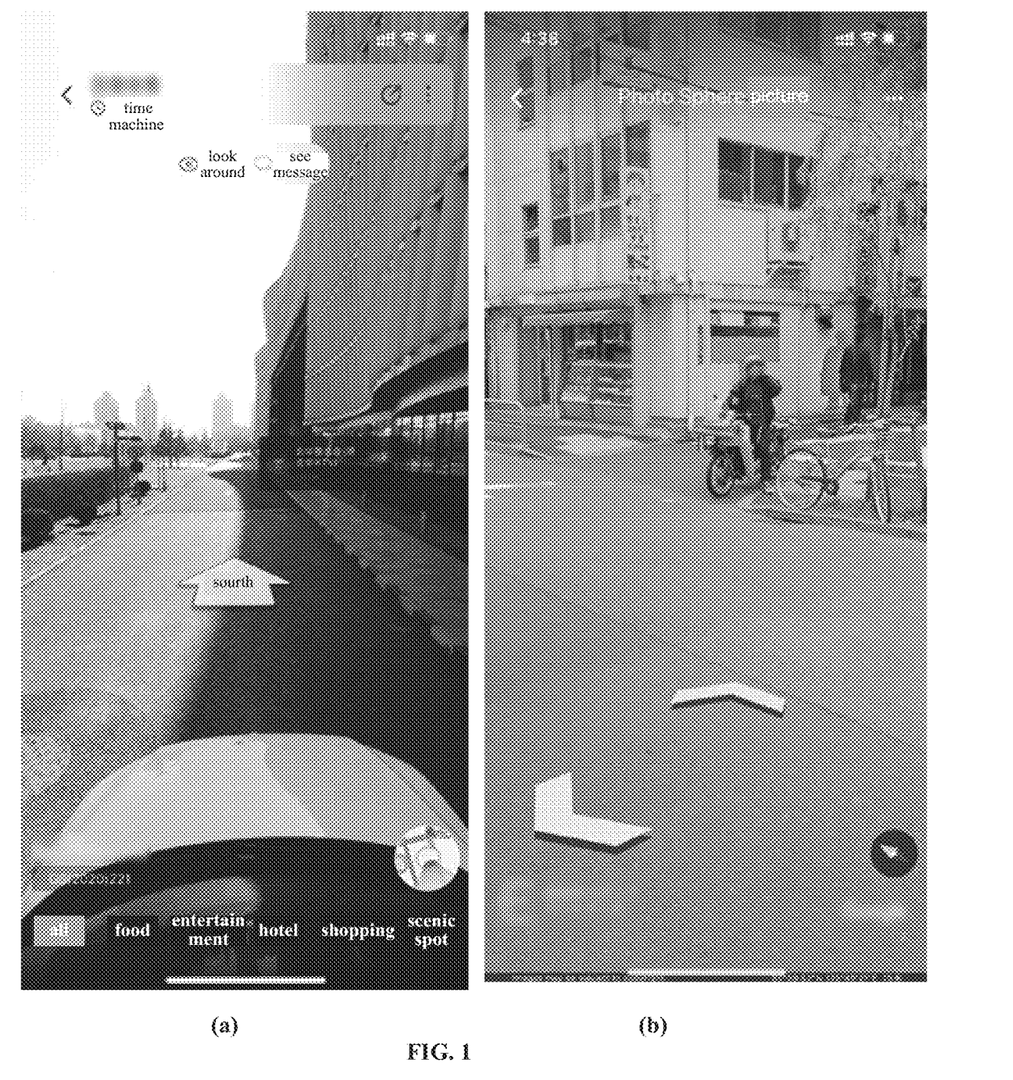
FIG. 1 is a schematic diagram showing display effects of street view maps of two map products.

At present, in an application interface of a street view map, a floating arrow on a road is usually used to guide switching of street views. Referring to FIG. 1(a) and FIG. 1(b), a user clicks an arrow to switch a map screen to a street view at a specified distance. In addition, another interaction way is to provide a window for entering a distance on an operation interface. The user may specify, for example, to move 100 meters to the west.

SUMMARY

The present disclosure provides a map displaying method, apparatus and device, a storage medium, a computer program product and a terminal device, to solve at least one of the foregoing problems.

According to a first aspect of the present disclosure, a map displaying method is provided and includes:

receiving a trigger operation in a case that a terminal device displays a map of a first area, and determining a screen coordinate of a trigger point, wherein the map of the first area is a map where a first position is at a center area;

determining a coordinate of a ground projection point corresponding to the trigger point based on the screen coordinate of the trigger point;

switching a currently displayed map of the first area, to a map of a second area, in a case that the ground projection point falls within the first area, wherein the map of the second area is a map where the ground projection point is at a center area.

According to a second aspect of the present disclosure, a map displaying apparatus is provided and includes:

a first trigger point coordinate processing module configured for receiving a trigger operation in a case that a terminal device displays a map of a first area, and determining a screen coordinate of the trigger point, wherein the map of the first area is a map where a first position is at a center area;

a second trigger point coordinate processing module configured for determining a coordinate of a ground projection point corresponding to the trigger point based on the screen coordinate of the trigger point; and a map switching module configured for switching a currently displayed map of the first area to a map of a second area, in a case that the ground projection point falls within the first area, wherein the map of the second area is a map where the ground projection point is at a center area.

According to a third aspect of the present disclosure, an electronic device is provided and includes:

at least one processor; and a memory communicatively connected to the at least one processor; wherein, the memory stores instructions executable by the at least one processor to enable the at least one processor to implement the foregoing method.

According to a fourth aspect of the present disclosure, a non-transitory computer-readable storage medium storing computer instructions is provided. The computer instructions are configured for causing the computer to perform the foregoing method.

According to a fifth aspect of the present disclosure, a computer program product is provided and includes a computer program for causing a processor to perform the foregoing method.

According to a sixth aspect of the present disclosure, a terminal device is provided and includes a processor and a memory. The memory is configured for storing a computer program; the processor is configured for calling and running the computer program stored in the memory to perform the foregoing method.

It is to be understood that the contents in this section are not intended to identify the key or critical features of the embodiments of the present disclosure, and are not intended to limit the scope of the present disclosure. Other features of the present disclosure will become readily apparent from the following description.

BRIEF DESCRIPTION OF THE DRAWINGS

The drawings are included to provide a better understanding of the present disclosure and are not to be construed as limiting the present disclosure. Wherein.

DETAILED DESCRIPTION

Reference will now be made in detail to the exemplary embodiments of the present disclosure, examples of which are illustrated in the accompanying drawings, wherein the various details of the embodiments of the present disclosure are included to facilitate understanding and are to be considered as exemplary only. Accordingly, a person skilled in the art should appreciate that various changes and modifications can be made to the embodiments described herein without departing from the scope and spirit of the present disclosure. Also, descriptions of well-known functions and structures are omitted from the following description for clarity and conciseness.

Figure 2:
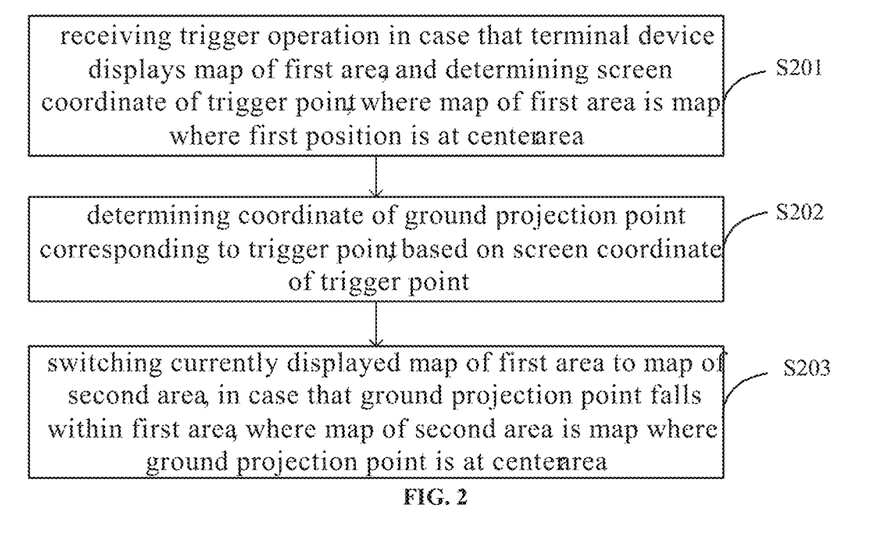
FIG. 2 is a flowchart of a map displaying method according to an embodiment of the present disclosure.

FIG. 2 is a flowchart of a map displaying method according to an embodiment of the present disclosure. The map displaying method includes the following the following steps S201 to S203.

S201: receiving a trigger operation in a case that a terminal device displays a map of a first area, and determining a screen coordinate of a trigger point, where the map of the first area is a map where a first position is at a center area.

S202: based on the screen coordinate of the trigger point, determining a coordinate of a ground projection point corresponding to the trigger point.

S203: switching the currently displayed map of the first area to a map of a second area, in a case that the ground projection point falls within the first area, where the map of the second area is a map where the ground projection point is at a center area.

According to the embodiment of the present disclosure, in a case that the terminal device displays the map of the first area (such as an area including a certain road), in response to clicking on a position (such as an end of the road) of interest in the map, the screen coordinate of the trigger point is acquired. By performing a series of necessary coordinate transformations on the screen coordinate, a coordinate of a projection point of the trigger point to a road surface can be obtained. The coordinate of the projection point can be used to judge whether the projection point falls within the first area (such as a surface of the road). In a case that the projection point falls within the first area, the map of the first area displayed by the terminal device is switched to the map of the second area. The map of the second area is a map where the ground projection point corresponding to the trigger point is located at a center area, such as a map of the end of the road.

According to the embodiment of the present disclosure, the screen coordinate of an interaction point is acquired, and a series of coordinate transformations and processing are performed on the screen coordinate to obtain a position of the interaction point projected onto the ground. A currently displayed map screen is switched to a map centered on the interaction point, in a case that the projection position of the interaction point meets requirements.

It can be seen that the map displaying method of the embodiment of the present disclosure can realize rapid switching of map screens displayed on the map. A user only needs to click on a certain position in a designated area of the map screen, and the map screen of the map can be switched to that position. Then, the map can present a fast-moving effect, which allows users to more conveniently and quickly query a map of a position of interest, thereby improving the user's experience.

In the embodiment of the present disclosure, optionally, the screen coordinate of the trigger point is a two-dimensional coordinate in a plane coordinate system constructed on a screen of the terminal device. Here, the "trigger point" may be a contact point where the user touches a terminal such as a screen of a mobile phone, or a point where the user clicks on a computer (PC) screen with a mouse. The two-dimensional coordinate of the trigger point obtained by constructing a plane coordinate system on the screen, are used as a starting point for subsequent coordinate transformations.

In the embodiment of the present disclosure, optionally, based on the screen coordinate of the trigger point, determining a coordinate of a ground projection point corresponding to the trigger point, includes: converting the screen coordinate of the trigger point into a three-dimensional coordinate in a currently displayed space; and, acquiring the coordinate of the ground projection point corresponding to the trigger point in the three-dimensional coordinate. Through the foregoing coordinate system conversion, the screen coordinate of the trigger point is converted to the coordinate of the ground projection point, which is easy for judging whether the trigger point falls within an area that is able to be quickly moved to.

In the embodiment of the present disclosure, optionally, the first area may cover at least a part of a road surface of a first road.

In the embodiment of the present disclosure, the first area may be regarded as "interaction hot zone". There is a stored panoramic map database corresponding to an area covered by the hot zone. Fast-moving can be triggered within the area covered by the hot zone.

Figure 3:
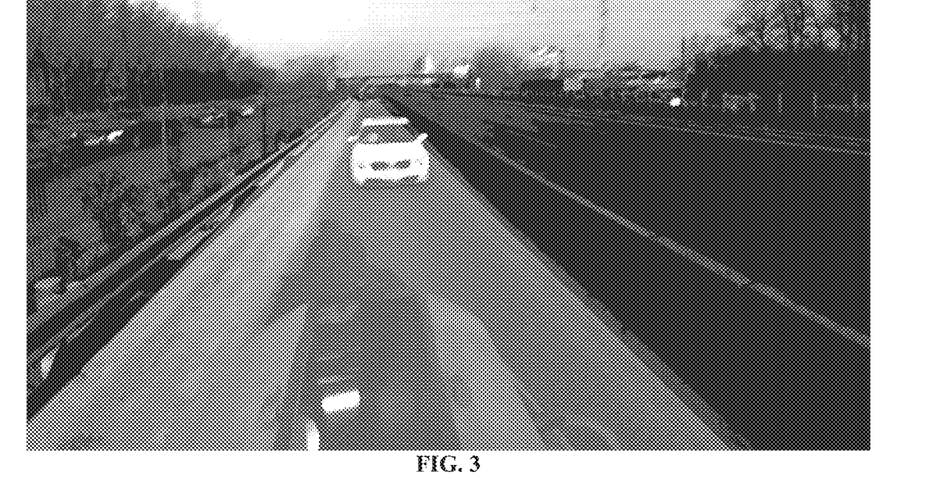
FIG. 3 is a schematic diagram of an interaction hot zone with an example of a lane area according to an embodiment of the present disclosure.

As an application scenario of the embodiment of the present disclosure, a user often inquires about routes or navigation through a map application (APP). Referring to an APP interface shown in FIG. 3, a lane where a vehicle is located is an interaction hot zone. In a case that the hot zone covers a road surface of a certain road, the user clicks on positions on the road surface at different distances, and the map screen will move back and forth between the various positions, which is convenient for the user to view multiple times when needed.

In the embodiment of the present disclosure, optionally, it is determined that the ground projection point falls within the first area, in a case that the ground projection point corresponding, to the trigger point is located on the at least a part of the road surface of the first road. In other words, it can be judged whether the ground projection point falls into the hot zone by judging whether the ground projection point falls on the road surface. Optionally, subsequent processing such as coordinate conversion is performed, in a case that the ground projection point falls into the hot zone; no processing or no response may be made, in a case that the ground projection point does not fall into the hot zone.

In the embodiment of the present disclosure, optionally, a distance between the ground projection point and a road centerline of the first road is calculated; it is determined that the ground projection point corresponding to the trigger point is located on the at least a part of the road surface of the first road, in a case that the distance is less than or equal to D/2, where D represents a road width of the first road.

According to at least one of the foregoing embodiments of the present disclosure, quickly switching the map screen to any position in the hot zone can be realized. In a case that the user wants to move to a specified position or wants to move quickly, through an interaction mode of triggering a position point on the road in a coverage area of the hot zone, the map screen can be moved to the triggered position conveniently and quickly without tedious and time-consuming operations.

The foregoing describes various implementations of the map displaying method of the embodiments of the present disclosure and obtained advantages. Specific processing process of the embodiment of the present disclosure will be described in details hereinafter with an example of fast-moving in a panoramic map.

In the process of collecting panoramic data, data such as a road width D, road orientation or road direction α of an actual road may be collected. Model transformation data that may be used for constructing a panoramic scene, may include, for example, a projection matrix, a view model matrix, etc.

(I) Projecting an Interaction Point with a Screen Coordinate onto an X-Z Plane where a Road is Located.

Figure 4:
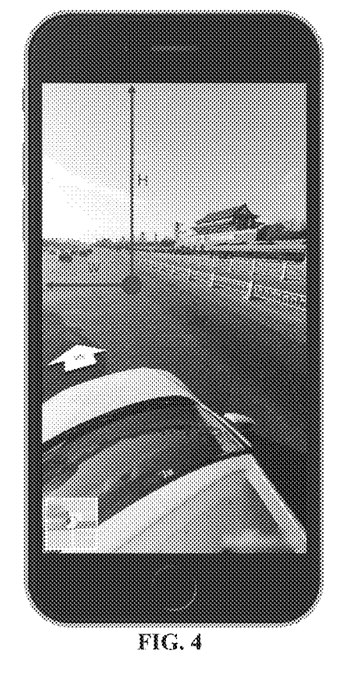
FIG. 4 is a schematic diagram of a trigger point on a screen according to an embodiment of the present disclosure.

(a) Referring to FIG. 4, in response to clicking on a point, i.e., a trigger point or an interaction point, on a road surface in a panoramic map, the screen coordinate [w, h] of the interaction point can be acquired. In a panoramic scene, since each point on a screen can be transformed into a point on a surface of a panoramic sphere model, in a case that the screen coordinate [w, h] of the interaction point as well as a width and height of the screen are known, a projection matrix $M_{proj}$ and a view model matrix $M_{mv}$ in the current scene can be obtained.

(b) A homogeneous coordinate [x,y,z,1] in a three-dimensional space corresponding to a plane coordinate is obtained, where x, y, z∈[−1, 1]; by making z=−1 so that a constructed interaction point is on a X-Y tangent plane of a panoramic sphere in a negative direction of the z-axis, a true three-dimensional coordinate of the interaction point can be restored according to the following formula:

$$coord = \left[\frac{w}{width}, \frac{h}{height}, 1, 1\right];$$

(c) According to inverse matrices of the projection matrix $M_{proj}$ and the view model matrix $M_{mv}$ in the current scene, original coordinate information res of the interaction point can be restored as follows:

$$res = coord \times M_{proj}^{-1} \times M_{mv}^{-1}$$

(d) After performing normalization calculation on res, first three values of res are taken and multiplied by a radius of the panoramic sphere model, thereby obtaining a spatial coordinate [x,y,z] of an interaction point M.

Figure 5:
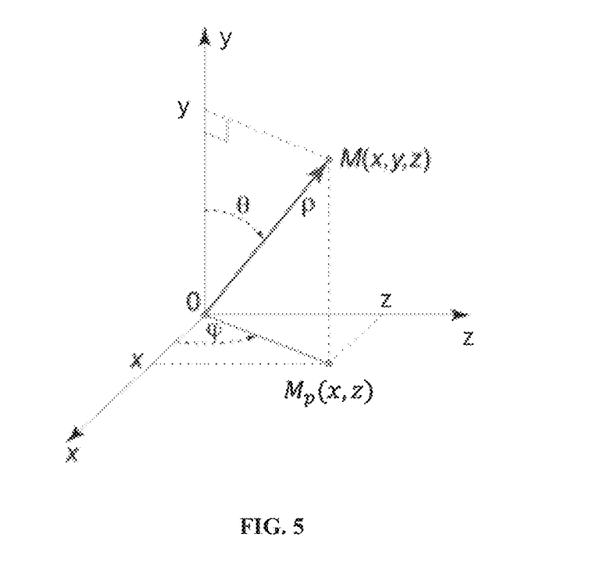
FIG. 5 is a schematic diagram of projecting the trigger point from a three-dimensional space to the ground according to an embodiment of the present disclosure.

(e) The interaction point is projected onto the X-Z plane, that is, on the screen where the ground is, thereby obtaining a projection point $M_p[x, z]$, as shown in FIG. 5.

(II) Judging Whether the Projection Point of the Interaction Point is on the Road Surface.

Figure 6:
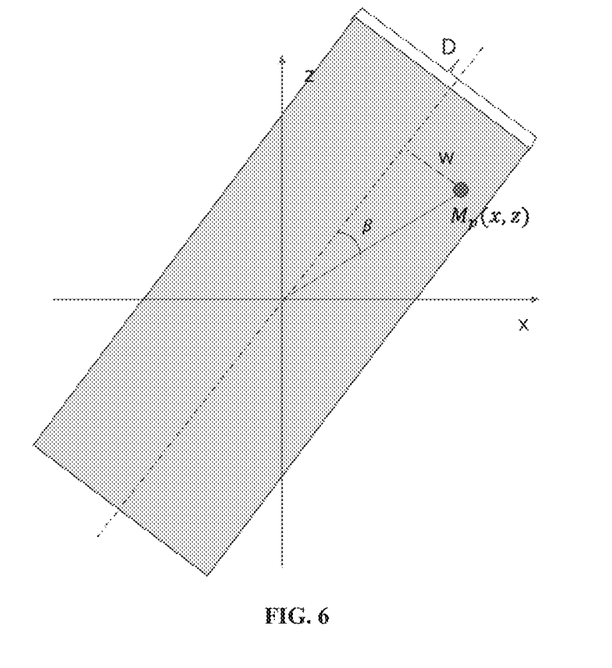
FIG. 6 is a schematic top view of a position of the trigger point on a road surface according to an embodiment of the present disclosure.

For clarity of description, FIG. 6 shows a schematic top view of a road surface. In FIG. 6, a gray area represents a projection of a road onto the X-Z plane, and a dashed line represents a road centerline.

(a) after obtaining the projection point $M_p[x, z]$ of the interaction point M on the X-Z plane, a connection line between the projection point and the origin can be calculated, and a distance d from the projection point to the origin and a vector ∂ of the connection line can be calculated according to the following formulas:

$$d = \sqrt{x^2 + z^2};$$

$$\partial = [x, z];$$

(b) after calculation of the link vector ∂ and a direction vector a of the road centerline, an angle between the two vectors can be calculated as β=∂×α;

(c) a distance between the interaction point M and the road centerline can be calculated through the following formula:

$$w = d \times \sin \beta;$$

(d) the road width D is a known quantity; in a case that w≤D/2, it can be judged that the interaction point M falls on the road surface.

(III) Switching Map Screens.

The current panoramic view is switched to a panoramic view at the interaction point M, i.e., the position clicked by the user.

Figure 7:
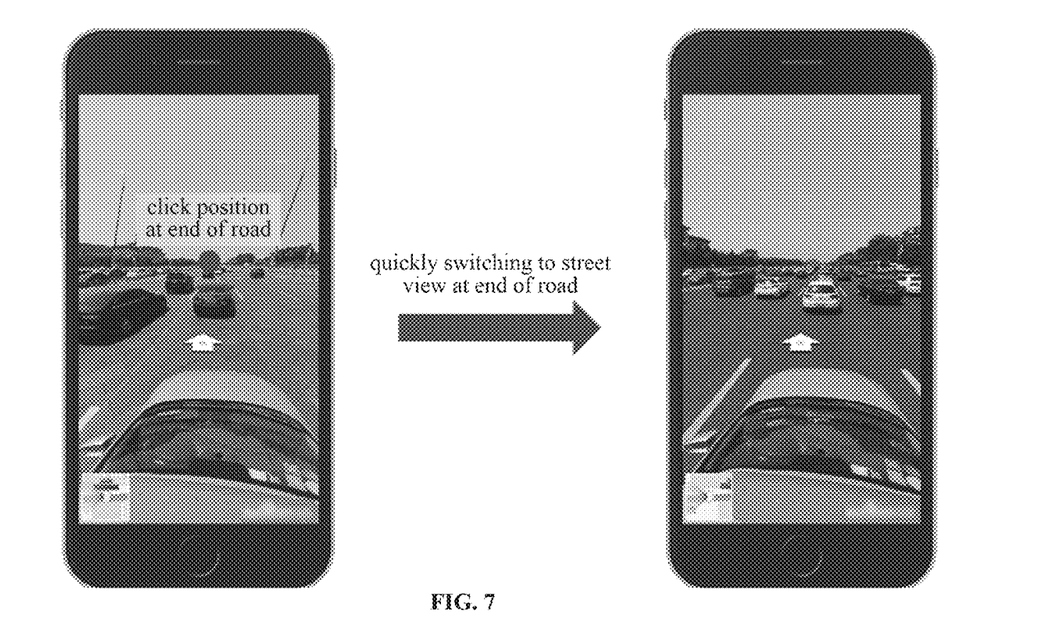
FIG. 7 is a schematic diagram of map screens displayed on a map before and after switching according to an embodiment of the present disclosure.

FIG. 7 schematically shows street views before and after switching according to an embodiment of the present disclosure. Specifically, the embodiment in FIG. 7 shows quickly switching to the street view at the end of the road after clicking a position at the end of the road. In the left image of FIG. 7, a user's vehicle is driving on a road surface area on the screen under the current view perspective. In a case that the user wants to view the street view at the end of the road and clicks on a position at the end of the road on the screen, the street view on the screen quickly switches to the street view at the end of the road shown in the right image of FIG. 7.

According to the embodiment of the present disclosure, the user does not need to click the screen multiple times or switch street view images on the screen multiple times; instead, the user only clicks on a target point in the road surface area, which enables the street view image on the screen to be quickly switched to a street view image of an area of interest centered on the target point.

Figure 8:
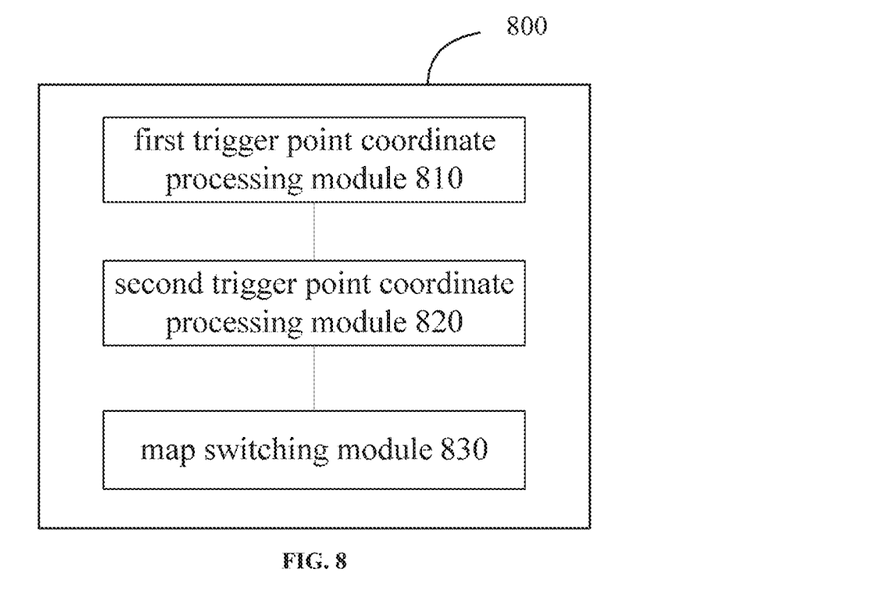
FIG. 8 is a structural block diagram of a map displaying apparatus according to an embodiment of the present disclosure.

The specific settings and implementations of the embodiments of the present disclosure have been described above from different perspectives through multiple embodiments. Corresponding to the method of at least one of the foregoing embodiments, one embodiment of the present disclosure further provides a map displaying apparatus 800. Referring to FIG. 8, the map displaying apparatus 800 includes a first trigger point coordinate processing module 810, a second trigger point coordinate processing module 820, and a map switching module 830.

The first trigger point coordinate processing module 810 is configured for receiving a trigger operation in a case that a terminal device displays a map of a first area, and determining a screen coordinate of a trigger point, where the map of the first area is a map where a first position is at a center area.

The second trigger point coordinate processing module 820 is configured for determining a coordinate of a ground projection point corresponding to the trigger point, based on the screen coordinate of the trigger point.

The map switching module 830 is configured for switching the currently displayed map of the first area to a map of a second area, in a case that the ground projection point falls within the first area, where the map of the second area is a map where the ground projection point is at a center area.

Optionally, the screen coordinate of the trigger point is a two-dimensional coordinate in a plane coordinate system constructed on a screen of the terminal device.

Optionally, the second trigger point coordinate processing module 820 includes: a first coordinate processing sub-module configured for converting the screen coordinate of the trigger point into a three-dimensional coordinate in a currently displayed space; and a second coordinate processing sub-module configured for acquiring the coordinate of the ground projection point corresponding to the trigger point in the three-dimensional coordinate.

Optionally, the first area may cover at least a part of a road surface of a first road.

Optionally, the map displaying apparatus 800 further includes a first determination module configured for determining that the ground projection point falls within the first area, in a case that the ground projection point corresponding to the trigger point is located on the at least a part of the road surface of the first road.

Optionally, the map displaying apparatus 800 further includes a calculation module configured for calculating a distance between the ground projection point and a road centerline of the first road; and a second determination module configured for determining that the ground projection point corresponding to the trigger point is located on the at least a part of the road surface of the first road, in a case that the distance is less than or equal to D/2, where D represents a road width of the first road.

Functions of various modules in the apparatus in the embodiments of the present disclosure may refer to the corresponding description in the foregoing method embodiments, which are not described herein again.

According to the embodiments of the present disclosure, the present disclosure further provides an electronic device, a readable storage medium and a computer program product.

Figure 9:
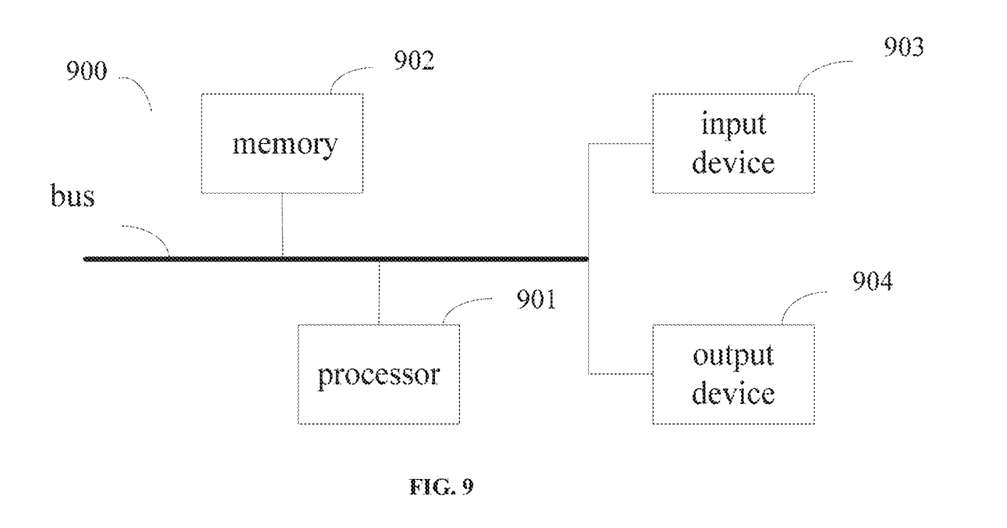
FIG. 9 is a block diagram of an electronic device for implementing a map displaying method according to an embodiment of the present disclosure.

FIG. 9 is a block diagram of an electronic device 900 for implementing a map displaying method according to an embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital assistants, cellular telephones, smart phones, wearable devices, and other similar computing devices. The components shown herein, their connections and relationships, and their functions are by way of example only and are not intended to limit the implementations of the present disclosure described and/or claimed herein.

As shown in FIG. 9, the electronic device includes: one or more processors 901, a memory 902, and interfaces for connecting various components, including high-speed interfaces and low-speed interfaces. The various components are interconnected using different buses and may be mounted on a common motherboard or otherwise as desired. The processor may process instructions for execution within the electronic device, including instructions stored in the memory or on the memory to display graphical information of a Graphical User Interface (GUI) on an external input/output device, such as a display device coupled to the interface. In other embodiments, multiple processors and/or multiple buses and multiple memories may be used with multiple memories if desired. Similarly, multiple electronic devices may be connected, each providing part of the necessary operations (e.g., as an array of servers, a set of blade servers, or a multiprocessor system). In FIG. 9, one processor 901 is taken as an example.

The memory 902 is a non-transitory computer-readable storage medium provided herein. The memory stores instructions executable by at least one processor to enable the at least one processor to implement the map displaying method provided herein. The non-transitory computer-readable storage medium of the present disclosure stores computer instructions for enabling a computer to implement the map displaying method provided herein.

The memory 902, as a non-transitory computer-readable storage medium, may be used to store non-transitory software programs, non-transitory computer-executable programs, and modules, such as program instructions/modules corresponding to the map displaying method of embodiments of the present disclosure. The processor 901 executes various functional applications of the server and data processing, i.e., the map displaying method in the above-mentioned method embodiment, by operating non-transitory software programs, instructions, and modules stored in the memory 902.

The memory 902 may include a program storage area and a data storage area, wherein the program storage area may store an application program required by an operating system and at least one function; the data storage area may store data created according to the use of the electronic device, etc. In addition, the memory 902 may include a high speed random access memory, and may also include a non-transitory memory, such as at least one magnetic disk storage device, a flash memory device, or other non-transitory solid state memory device. In some embodiments, the memory 902 may optionally include memories remotely located with respect to the processor 901, which may be connected via a network to the electronic device. Examples of such networks include, but are not limited to, the Internet, intranet, local area networks, mobile communication networks, and combinations thereof.

The electronic device for implementing the map displaying method may further include: an input device 903 and an output device 904. The processor 901, the memory 902, the input device 903, and the output device 904 may be connected via a bus or otherwise. FIG. 9 takes a bus connection as an example.

The input device 903 may receive input numeric or character information and generate key signal inputs related to user settings and functional controls of the electronic device, such as input devices including touch screens, keypads, mice, track pads, touch pads, pointing sticks, one or more mouse buttons, trackballs, joysticks, etc. The output device 904 may include display devices, auxiliary lighting devices (e.g., a Light Emitting Diode (LED)), tactile feedback devices (e.g., vibration motors), and the like. The display device may include, but is not limited to, a Liquid Crystal Display (LCD), a Light Emitting Diode (LED) display, and a plasma display. In some embodiments, the display device may be a touch screen.

Various embodiments of the systems and techniques described herein may be implemented in digital electronic circuit systems, integrated circuit systems, Application Specific Integrated Circuits (ASICs), computer hardware, firmware, software, and/or combinations thereof. These various embodiments may include: implementation in one or more computer programs which can be executed and/or interpreted on a programmable system including at least one programmable processor, and the programmable processor may be a dedicated or general-purpose programmable processor which can receive data and instructions from, and transmit data and instructions to, a memory system, at least one input device, and at least one output device.

These computing programs (also referred to as programs, software, software applications, or codes) include machine instructions of a programmable processor, and may be implemented using high-level procedural and/or object-oriented programming languages, and/or assembly/machine languages. As used herein, the terms "machine-readable medium" and "computer-readable medium" refer to any computer program product, device, and/or apparatus (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide an interaction with a user, the systems and techniques described herein may be implemented on a computer having: a display device (e.g., a Cathode Ray Tube (CRT) or Liquid Crystal Display (LCD) monitor) for displaying information to a user; and a keyboard and a pointing device (e.g., a mouse or a trackball) by which a user can provide input to the computer. Other types of devices may also be used to provide interaction with a user; for example, the feedback provided to the user may be any form of sensory feedback (e.g., visual feedback, audible feedback, or tactile feedback); and input from the user may be received in any form, including acoustic input, audio input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or in a computing system that includes any combination of such background component, middleware component, or front-end component. The components of the system may be interconnected by digital data communication a communication network) of any form or medium. Examples of the communication network include: a Local Area Networks (LAN), a Wide Area Networks (WAN), and the Internet.

The computer system may include a client and a server. The client and the server are typically remote from each other and typically interact through a communication network. A relationship between the client and the server is generated by computer programs operating on respective computers and having a client-server relationship with each other.

It will be appreciated that the various forms of flow, reordering, adding or removing steps shown above may be used. For example, the steps recited in the present disclosure may be performed in parallel or sequentially or may be performed in a different order, so long as the desired results of the technical solutions disclosed in the present disclosure can be achieved, and no limitation is made herein.

The above-mentioned embodiments are not to be construed as limiting the scope of the present disclosure. It will be apparent to a person skilled in the art that various modifications, combinations, sub-combinations and substitutions are possible, depending on design requirements and other factors. Any modifications, equivalents, and improvements within the spirit and principles of the present disclosure are intended to be included within the scope of the present disclosure.

What is claimed is:

1. A map displaying method, comprising:
   receiving a trigger operation in a case that a terminal device displays a map of a first area, and determining a screen coordinate of a trigger point, wherein the map of the first area is a map where a first position is at a center area, and the first area covers at least a part of a road surface of a first road;
   determining a coordinate of a ground projection point corresponding to the trigger point, based on the screen coordinate of the trigger point;
   calculating a distance between the ground projection point and a road centerline of the first road;
   determining that the ground projection point corresponding to the trigger point is located on the at least a part of the road surface of the first road, in a case that the distance is less than or equal to D/2, wherein D represents a road width of the first road;
   determining that the ground projection point falls within the first area, in a case that the ground projection point corresponding to the trigger point is located on the at least a part of the road surface of the first road; and
   switching a currently displayed map of the first area to a map of a second area, in a case that the ground projection point falls within the first area, wherein the map of the second area is a map where the ground projection point is at a center area.

2. The method of claim 1, wherein the screen coordinate of the trigger point is a two-dimensional coordinate in a plane coordinate system constructed on a screen of the terminal device.

3. The method of claim 1, wherein the determining the coordinate of the ground projection point corresponding to the trigger point based on the screen coordinate of the trigger point, comprises:
   converting the screen coordinate of the trigger point into a three-dimensional coordinate in a currently displayed space; and
   acquiring the coordinate of the ground projection point corresponding to the trigger point in the three-dimensional coordinate.

4. An electronic device, comprising:
   at least one processor; and
   a memory communicatively connected to the at least one processor; wherein,
   the memory stores instructions executable by the at least one processor to enable the at least one processor to:
   receive a trigger operation in a case that a terminal device displays a map of a first area, and determine a screen coordinate of a trigger point, wherein the map of the first area is a map where a first position is at a center area, and the first area covers at least a part of a road surface of a first road;
   determine a coordinate of a ground projection point corresponding to the trigger point, based on the screen coordinate of the trigger point;
   calculate a distance between the ground projection point and a road centerline of the first road;
   determine that the ground projection point corresponding to the trigger point is located on the at least a part of the road surface of the first road, in a case that the distance is less than or equal to D/2, wherein D represents a road width of the first road;
   determine that the ground projection point falls within the first area, in a case that the ground projection point corresponding to the trigger point is located on the at least a part of the road surface of the first road; and
   switch a currently displayed map of the first area to a map of a second area, in a case that the ground projection point falls within the first area, wherein the map of the second area is a map where the ground projection point is at a center area.

5. The electronic device of claim 4, wherein the screen coordinate of the trigger point is a two-dimensional coordinate in a plane coordinate system constructed on a screen of the terminal device.

6. The electronic device of claim 4, wherein the instructions are executable by the at least one processor to enable the at least one processor further to:
convert the screen coordinate of the trigger point into a three-dimensional coordinate in a currently displayed space; and
acquire the coordinate of the ground projection point corresponding to the trigger point in the three-dimensional coordinate.

7. A non-transitory computer-readable storage medium storing computer instructions for causing a computer to:
receive a trigger operation in a case that a terminal device displays a map of a first area, and determine a screen coordinate of a trigger point, wherein the map of the first area is a map where a first position is at a center area, and the first area covers at least a part of a road surface of a first road;
determine a coordinate of a ground projection point corresponding to the trigger point, based on the screen coordinate of the trigger point;
calculate a distance between the ground projection point and a road centerline of the first road;
determine that the ground projection point corresponding to the trigger point is located on the at least a part of the road surface of the first road, in a case that the distance is less than or equal to D/2, wherein D represents a road width of the first road;
determine that the ground projection point falls within the first area, in a case that the ground projection point corresponding to the trigger point is located on the at least a part of the road surface of the first road; and
switch a currently displayed map of the first area to a map of a second area, in a case that the ground projection point falls within the first area, wherein the map of the second area is a map where the ground projection point is at a center area.

8. The storage medium of claim 7, wherein the screen coordinate of the trigger point is a two-dimensional coordinate in a plane coordinate system constructed on a screen of the terminal device.

9. The storage medium of claim 7, wherein the computer instructions are configured for causing the computer further to:
convert the screen coordinate of the trigger point into a three-dimensional coordinate in a currently displayed space; and
acquire the coordinate of the ground projection point corresponding to the trigger point in the three-dimensional coordinate.

10. A terminal device, comprising: a processor and a memory;
wherein the memory is configured for storing a computer program;
the processor is configured for calling and running the computer program stored in the memory to:
receive a trigger operation in a case that a terminal device displays a map of a first area, and determine a screen coordinate of a trigger point, wherein the map of the first area is a map where a first position is at a center area, and the first area covers at least a part of a road surface of a first road;
determine a coordinate of a ground projection point corresponding to the trigger point, based on the screen coordinate of the trigger point;
calculate a distance between the ground projection point and a road centerline of the first road;
determine that the ground projection point corresponding to the trigger point is located on the at least a part of the road surface of the first road, in a case that the distance is less than or equal to D/2, wherein D represents a road width of the first road;
determine that the ground projection point falls within the first area, in a case that the ground projection point corresponding to the trigger point is located on the at least a part of the road surface of the first road; and
switch a currently displayed map of the first area to a map of a second area, in a case that the ground projection point falls within the first area, wherein the map of the second area is a map where the ground projection point is at a center area.

11. The terminal device of claim 10, wherein the screen coordinate of the trigger point is a two-dimensional coordinate in a plane coordinate system constructed on a screen of the terminal device.

* * * * *